US008755052B2

(12) United States Patent
Ono et al.

(10) Patent No.: US 8,755,052 B2
(45) Date of Patent: Jun. 17, 2014

(54) SHAPE MEASURING METHOD

(75) Inventors: Masayuki Ono, Kawasaki (JP); Akinori Miyata, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 154 days.

(21) Appl. No.: 13/314,463

(22) Filed: Dec. 8, 2011

(65) Prior Publication Data

US 2012/0154820 A1    Jun. 21, 2012

(30) Foreign Application Priority Data

Dec. 21, 2010   (JP) ................................. 2010-284198

(51) Int. Cl.
*G01B 11/24*    (2006.01)
*G01B 11/25*    (2006.01)
*G01B 11/30*    (2006.01)

(52) U.S. Cl.
CPC ............... *G01B 11/24* (2013.01); *G01B 11/25* (2013.01); *G01B 11/306* (2013.01)
USPC ...................... 356/601; 356/237.2; 356/237.6

(58) Field of Classification Search
CPC ...... G01B 11/24; G01B 11/25; G01B 11/306; G01B 11/245; G01T 7/0057
USPC .................................... 356/601, 237.1–237.6
See application file for complete search history.

(56) References Cited

U.S. PATENT DOCUMENTS

| | | | | |
|---|---|---|---|---|
| 5,546,179 A | * | 8/1996 | Cheng | 356/73 |
| 5,822,877 A | * | 10/1998 | Dai | 33/560 |
| 5,917,181 A | * | 6/1999 | Yoshizumi et al. | 250/230 |
| 6,701,633 B2 | * | 3/2004 | Ohtsuka | 33/552 |
| 7,046,350 B2 | | 5/2006 | Yamagata et al. | |
| 8,006,402 B2 | * | 8/2011 | Yoshizumi et al. | 33/556 |
| 8,225,519 B2 | * | 7/2012 | Hon et al. | 33/559 |
| 2002/0148130 A1 | * | 10/2002 | Ohtsuka | 33/552 |
| 2002/0196428 A1 | | 12/2002 | Yamagata et al. | |
| 2005/0206877 A1 | * | 9/2005 | Ina et al. | 356/72 |
| 2007/0247639 A1 | * | 10/2007 | Amstel et al. | 356/601 |

(Continued)

FOREIGN PATENT DOCUMENTS

| | | |
|---|---|---|
| CN | 101482397 A | 7/2009 |
| CN | 101669009 A | 3/2010 |

(Continued)

OTHER PUBLICATIONS

Apr. 5, 2012 European Search Report in European Patent Appln. No. 11193418.8.

(Continued)

*Primary Examiner* — Tarifur Chowdhury
*Assistant Examiner* — Isiaka Akanbi
(74) *Attorney, Agent, or Firm* — Fitzpatrick, Cella, Harper & Scinto (57) ABSTRACT

A shape-measuring method accurately performs fitting between measured data of a surface to be measured, which is formed based on a design shape having multiple periodical design-level differences, and a design shape. A level-difference region and a level-difference height are specified from a measured point sequence of the surface to be measured. A point sequence is moved by a level-difference height. In other words, a process for eliminating the level difference is performed, and fitting target data without a level difference is obtained. On the other hand, a reference shape without multiple design-level differences is obtained from the design shape. Fitting between the fitting target data and the reference shape is performed by the least square method or the like.

7 Claims, 6 Drawing Sheets

(56) References Cited

U.S. PATENT DOCUMENTS

| | | |
|---|---|---|
| 2009/0021747 A1* | 1/2009 | Kawasaki et al. ............. 356/501 |
| 2009/0063075 A1 | 3/2009 | Liu et al. |
| 2010/0119104 A1 | 5/2010 | Mamour et al. |
| 2013/0197844 A1* | 8/2013 | Oota ............................... 702/94 |

FOREIGN PATENT DOCUMENTS

| | | | |
|---|---|---|---|
| GB | 2464509 A | 4/2010 | |
| JP | 11-167013 A | 6/1999 | |
| WO | 2010/049693 A2 | 5/2010 | |
| WO | WO 2011/051732 A1 * | 11/2010 | |
| WO | 2011/051732 A1 | 5/2011 | |

OTHER PUBLICATIONS

Feb. 8, 2014 Chinese Official Action in Chinese Patent Appln. No. 20111043154.9.

* cited by examiner

SHAPE MEASURING METHOD

BACKGROUND OF THE INVENTION

1. Field of the Invention

The present invention relates to a shape-measuring method for accurately measuring a surface shape of an optical element or a die for manufacturing the optical element, the surface shape being formed based on a design shape having multiple periodical design-level differences.

2. Description of the Related Art

With the improvement of performance in various optical devices such as an image pickup camera, a laser beam printer, a copying machine, and a semiconductor exposure apparatus, requirements for optical elements incorporated in those optical devices have become severer. In recent years, in particular, diffraction-grating optical elements utilizing a diffraction-grating phenomenon are used for various products. Many such diffraction-grating optical elements have a regular unevenness of several nanometers to several tens of micrometers on the surface to generate a phase difference of light, so that a diffraction phenomenon is generated. In order to accurately measure a surface shape of an optical element or a surface shape of a die for molding an optical element in this way, it is necessary to perform accurate fitting between measured data of multiple measuring points and the design shape so as to eliminate a setting error of a work. Here, the fitting between the measured data and the design shape includes not only matching of the measured data and the design shape but also moving a parameter of the design shape to fit the design shape with the measured data and performing predetermined conversions on the design shape and the measured data for fitting.

By the way, it is difficult to fit between the measured data of a surface to be measured which is formed based on a design shape having multiple periodical design-level differences and the design shape, because there is a level-difference portion. Therefore, as a method of fitting the measured data with the design shape, the following method is known. Specifically, an array of multiple measuring points at which the surface to be measured is measured is converted to an approximate shape such as an aspherical surface or a spherical surface without level differences by using the least square method, and the design shape used is a no-level-difference shape without a design-level difference. Then, the approximate shape and the no-level-difference shape are fitted (see Japanese Patent Application Laid-Open No. H11-167013). In the case of this structure, because there is no component of a level-difference portion, it is considered that the fitting itself can be performed easily.

However, in the case of the invention described in Japanese Patent Application Laid-Open No. H11-167013, the design shape for fitting with the approximate shape determined from the measured point sequence does not contain a level-difference-shape component, and hence fitting accuracy cannot be improved due to the influence of the level-difference-shape component contained in the approximate shape. In other words, the surface to be measured is a combination shape of a level-difference-shape component and a no-level-difference-shape component (for example, a curved-surface-shape component), and a shape-measuring machine measures along the combination shape. Therefore, the measured point sequence contains a no-level-difference-shape component and a level-difference-shape component. Therefore, the approximate shape determined by the least square method or the like also contains a level-difference-shape component. On the other hand, only a no-level-difference-shape component is used in the design shape for fitting.

Therefore, because the design shape does not contain a level-difference-shape component, the level-difference-shape component of the approximate shape is affected by measurement noise or the like when the fitting is performed, and hence the fitting accuracy cannot be improved. In other words, because the fitting is performed between the shape containing a level-difference-shape component and a shape containing a no-level-difference-shape component, it is difficult to perform the fitting accurately. If the fitting accuracy is not good, a work-setting error cannot be accurately eliminated. As a result, measuring accuracy is also decreased.

SUMMARY OF THE INVENTION

In view of those circumstances, an object of the present invention is to provide a shape-measuring method that enables accurate fitting between measured data of a surface to be measured which is formed based on a design shape having multiple periodical design-level differences and the design shape.

The present invention provides a shape-measuring method for measuring a surface to be measured which is formed based on a design shape having multiple periodical design-level differences, by using a probe to scan, the shape-measuring method including: a measuring step of scanning the surface to be measured with the probe to obtain multiple measuring points; a level-difference specifying step of specifying, from the multiple measuring points, multiple level-difference regions in which multiple level differences exist respectively on the surface to be measured and a height of each of the multiple level differences; a target-data generating step of moving, among multiple no-level-difference regions outside the multiple level-difference regions, multiple measuring points of one of a pair of no-level-difference regions adjacent to each other on both sides of each of the multiple level-difference regions by the height of the each of the multiple level differences, so as to adjust the heights of the multiple measuring points in the one of the pair of no-level-difference regions to heights of the multiple measuring points in another one of the pair of no-level-difference regions, to thereby obtain fitting target data; a reference-shape obtaining step of obtaining a reference shape without the multiple design-level differences from the design shape; and a fitting step of performing fitting between the fitting target data and the reference shape, in which the shape of the surface to be measured is measured by determining a residual between the fitting target data and the reference shape after the fitting.

According to the present invention, the fitting is performed between the fitting target data obtained by removing the level-difference-shape component from the measured data and the reference shape without a level-difference-shape component obtained from the design shape. Therefore, it is possible to perform accurate fitting between measured data of the surface to be measured which is formed based on a design shape having multiple periodical design-level differences and the design shape.

Further features of the present invention will become apparent from the following description of exemplary embodiments with reference to the attached drawings.

DESCRIPTION OF THE EMBODIMENTS

An embodiment of the present invention is described with reference to FIGS. 1 to 6.

[Shape-Measuring Apparatus]

Figure 1:
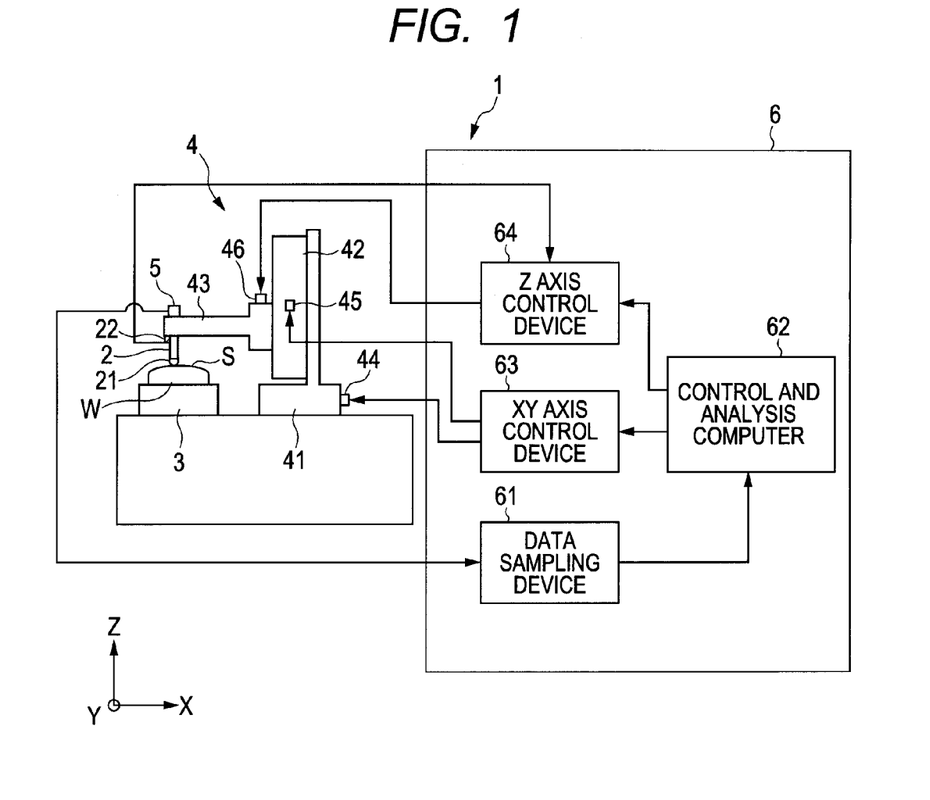
FIG. 1 is a schematic configuration diagram of a three-dimensional shape-measuring apparatus according to an embodiment of the present invention.

First, a shape-measuring apparatus of this embodiment is described with reference to FIG. 1. A shape-measuring apparatus 1 includes a probe 2, a surface plate 3, a moving unit 4 that supports and moves the probe 2, a displacement measuring unit 5 that measures a displacement of the probe 2, and a control portion 6. The shape-measuring apparatus 1 measures a shape of a surface S to be measured of an object to be measured (work) W placed on the surface plate 3. Particularly in the case of this embodiment, the object W to be measured is an object having the surface S to be measured that is not smooth, such as a diffraction-grating optical element having a diffraction grating constituted of unevenness of several nanometers to several tens of micrometers, or a die for molding the optical element. In addition, this object W to be measured has the surface S to be measured that is formed based on a design shape having multiple periodical design-level differences corresponding to the above-mentioned diffraction grating. In other words, multiple level differences (of the diffraction grating) corresponding to the multiple design-level differences are formed on the surface S to be measured.

The probe 2 is a rod-like member having a ball (tip ball) 21 with a small curvature radius at its tip, and the tip of the probe 2 contacts the surface S to be measured of the object W to be measured. The curvature radius of the tip is small enough to detect the unevenness of several nanometers to several tens of micrometers. In other words, the tip ball 21 of the probe 2 has a curvature radius that is small enough to contact the vicinity of a valley portion of the level difference of the diffraction grating. This contact-type probe 2 may have a structure in which the ball 21 is fixed to the probe 2 by any fixing method or a structure in which the probe 2 and the ball 21 are formed integrally.

The surface plate 3 is disposed to be opposed to the tip of the probe 2 and has a surface that is a plane (XY plane) perpendicular to the direction of the probe 2 (Z direction). Then, the object W to be measured is placed on this surface (placement surface) so that the surface S to be measured faces the probe 2. Note that, it is preferred that the surface plate 3 have an anti-vibration function in order to suppress the influence of vibration from a floor. For instance, an elastic member made of rubber or the like may be disposed between an installation portion on the floor and the placement surface.

The moving unit 4 includes an X axis stage 41, a Y axis stage 42, a Z axis stage 43, and motors 44, 45, and 46 such as stepping motors for driving the stages. The motor 44 moves the X axis stage 41 in the X axis direction, the motor 45 moves the Y axis stage 42 in the Y axis direction, and the motor 46 moves the Z axis stage 43 in the Z axis direction, via a ball-screw mechanism or the like, for example.

Figure 2A:
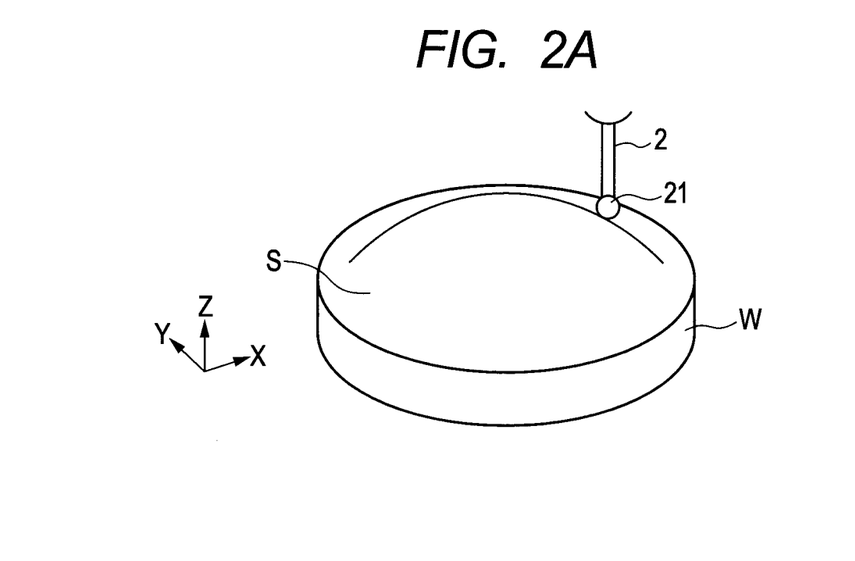
FIGS. 2A and 2B are perspective views of schematic structure illustrating two examples of a probe of the shape-measuring apparatus.

The probe 2 is disposed at a part of the Z axis stage 43 in the Z axis direction, and the Z axis stage 43 and the Y axis stage 42 are supported by the Y axis stage 42 and the X axis stage 41, respectively. Therefore, as illustrated in FIG. 2A, the probe 2 can move in three axis translation directions, namely in the X, Y, and Z directions, which are perpendicular to one another, while the probe tip ball 21 contacts the object W to be measured.

Note that, another structure is possible, in which the surface plate 3 is movable in the X and Y axis directions while the probe 2 is movable only in the Z axis direction. In this case too, the probe 2 can move in the three axis translation directions relative to the object W to be measured placed on the surface plate 3. Alternatively, the probe 2 may be structured to move in the rotational direction about one axis and move in two axis translation directions. For instance, one of the X axis stage 41 and the Y axis stage 42 may be replaced with a stage that can rotate around a center axis parallel to the Z axis (move in an R direction). Note that, in this structure too, the movements in the X axis direction (or in the Y axis direction) and in the R direction may be performed by the surface plate 3.

The displacement measuring unit (position detection sensor) 5 measures a three-dimensional position of the probe 2 using an interference measurement or the like with a reflection mirror disposed at the proximal end of the probe 2. For instance, a reference mirror is disposed at a periphery of the proximal end of the probe 2, and a distance between the reflection mirror and the reference mirror is measured by a laser so that a three-dimensional position of the probe 2 can be measured. Note that, other position detection sensors, such as a linear scale encoder, may be used as the position detection sensor.

The control portion 6 includes a data sampling device 61, a control and analysis computer 62 as a computing device, an XY axis control device 63, and a Z axis control device 64. The three-dimensional position of the probe 2 measured by the displacement measuring unit 5 is sampled at a predetermined time interval by the data sampling device 61. The sampled discrete data is stored as measured data in a memory inside the control and analysis computer 62 and is used by the control and analysis computer 62 for calculation of the shape of the surface S to be measured. In other words, the control and analysis computer 62 is constituted by a processor (not shown) using a CPU or the like, a hard disk drive (not shown), and other storage unit (memory). A shape-measuring program is installed in the control and analysis computer 62.

In addition, the control and analysis computer 62 controls the moving unit 4 to move the probe 2 along a predetermined scanning locus. Specifically, the motors 44, 45, and 46 are driven by being supplied with electric power from the XY axis control device 63 and the Z axis control device 64 based on a drive control signal, to thereby move the stages 41, 42, and 43, respectively. The XY axis control device 63 and the Z axis control device 64 operate in response to the drive-control signal from the control and analysis computer 62. In this way, the moving unit 4 is controlled so that the probe 2 is moved along the scanning locus, and a moving locus of a center position of the probe tip ball 21 is detected by the displacement measuring unit 5. The detected moving locus data is transmitted to the data sampling device 61 as described above and is used by the control and analysis computer 62 for calculation of the shape of the surface S to be measured.

Here, the driving of the Z axis stage 43 in the shape measurement is described in detail. In the case of this embodiment, there is disposed a contact force detecting portion 22 that detects the contact force between the contact-type probe 2 and the object W to be measured. The contact force detecting portion 22 outputs a contact-force signal corresponding to the level of the detected contact force, and this signal is received by the Z axis control device 64. The Z axis control device 64 includes a processor (not shown) constituted mainly by a digital signal processor (DSP) or the like, and a storage unit (memory; not shown) constituted by a ROM or the like. Further, a control program for performing control to maintain the contact-force signal detected from the contact-force detection signal to be constant is installed in the Z axis control device 64. The Z axis control device 64 outputs Z axis drive power so as to maintain the contact-force signal to be a constant value according to the control program, and the output drive power is supplied to the motor 46 for driving the Z axis stage 43. Then, the Z axis stage 43 is driven so as to maintain a constant contact force between the probe 2 and the object W to be measured.

Next, the driving of the X and Y axis stages 41 and 42 in the shape measurement is described in detail. The control and analysis computer 62 transmits the drive-control signal to the XY axis control device 63 according to a command of the above-mentioned shape-measuring program executed in the shape measurement. Based on the drive-control signal received from the control and analysis computer 62, the XY axis control device 63 supplies drive power to the motors 44 and 45 for driving the X and Y axis stages 41 and 42. Then, the X axis stage 41 and the Y axis stage 42 are driven by the motors 44 and 45 that are driven by the drive power, and hence the probe 2, specifically the center position of the probe tip ball 21, is controlled to be positioned in the X and Y axis directions with respect to the object W to be measured.

As described above, the probe 2 scans the surface S to be measured of the object W to be measured according to a measuring path set by the above-mentioned shape-measuring program, based on the drive of the X, Y, and Z axis stages 41, 42, and 43. During the probe scanning, the output signal of the displacement measuring unit 5 that detects the center position of the probe tip ball 21 is received by the data sampling device 61 at a constant sampling interval. Further, the received data is measured successively from the data sampling device 61 to the control and analysis computer 62 at an appropriate sampling interval corresponding to a measuring condition set by the shape-measuring program, and the measured surface-shape data is obtained as data of X, Y, and Z coordinate points. Finally, the surface-shape data is obtained by performing shape analysis described later after the probe scanning is finished.

Figure 2B:
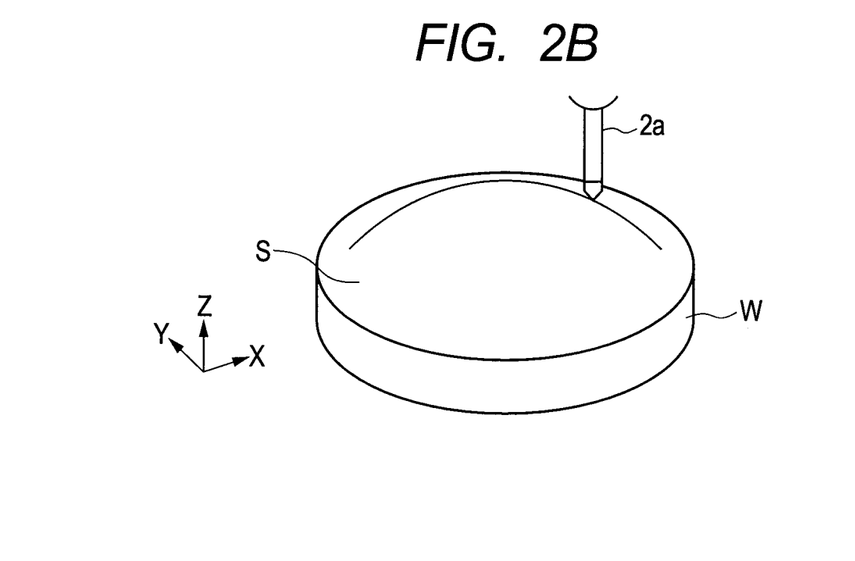

Note that, the contact-type probe 2 is used in this embodiment as illustrated in FIG. 2A, but a non-contact-type probe 2a may be used as illustrated in FIG. 2B. The non-contact-type probe 2a is supported to be movable relatively in the X, Y, and Z axis directions while irradiating the surface S to be measured of the object W to be measured with light such as a laser beam. In the case of the above-mentioned contact-type probe 2, the Z axis stage 43 is driven so as to maintain a constant contact force with the object W to be measured. In contrast, the non-contact-type probe 2a has a function of detecting a distance between the probe 2a and the object W to be measured. Then, the Z axis stage is driven while being controlled to maintain the distance to be constant, and this point is different from the contact-type probe 2. Other structures of the apparatus are the same as those of the shape-measuring apparatus including the contact-type probe. Note that, the coordinate system illustrated in FIG. 1 is a coordinate system of the three-dimensional shape-measuring apparatus, while the coordinate system illustrated in FIGS. 2A and 2B is a coordinate system of the object W to be measured, which are different from each other.

[Shape-Measuring Method]

The shape-measuring apparatus 1 having the structure described above measures the shape of the surface S to be measured of the object W to be measured that is formed based on a design shape having multiple periodical design-level differences, by the following shape-measuring method. Specifically, the moving unit 4 moves the probe 2 to scan the surface S to be measured in the state where the probe 2 is in contact with the surface S to be measured. Then, a three-dimensional position of the probe 2 is measured by the displacement measuring unit 5, and fitting between the measured data and the design shape is performed as follows, so as to measure the shape of the surface S to be measured.

Figure 3:
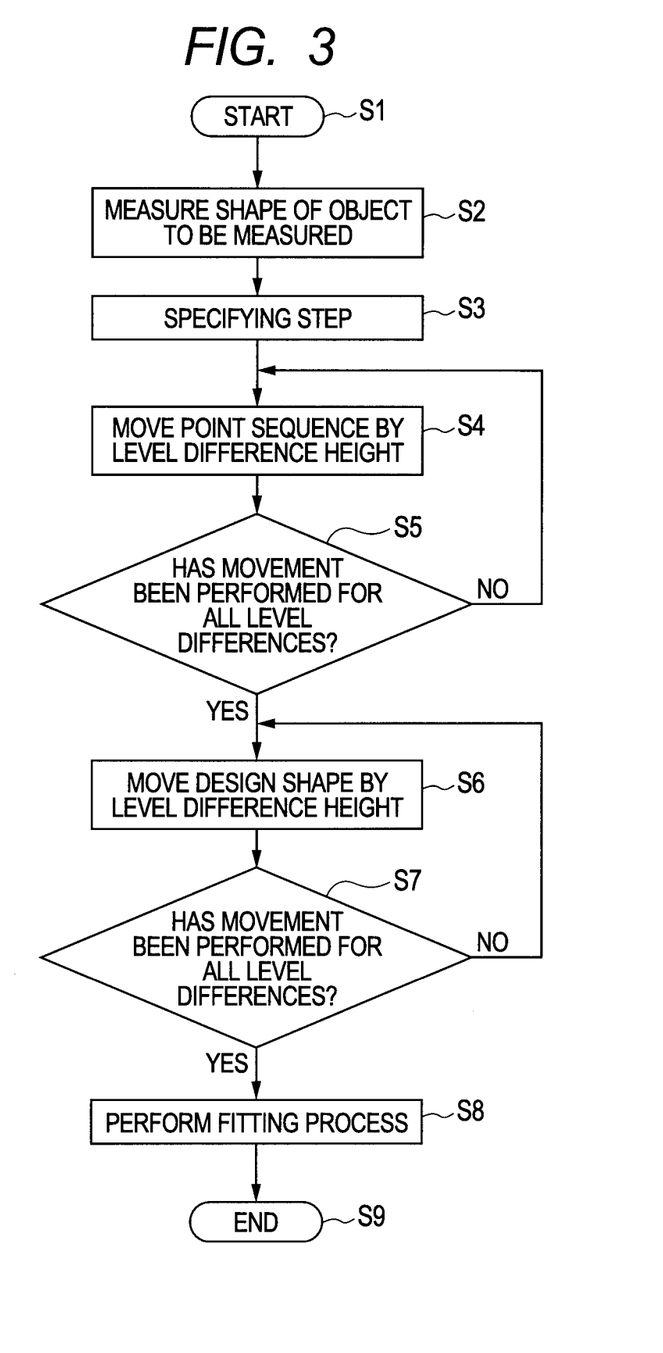
FIG. 3 is a flowchart illustrating a fitting-process step and the steps performed prior to the fitting-process step in the embodiment.

The shape-measuring method of this embodiment includes a measuring step, a level-difference specifying step, a target-data generating step, a reference-shape obtaining step, and a fitting step. As illustrated in FIG. 3, when the measurement is started (S1), first, in the measuring step, shape measurement of the object W to be measured is performed. In other words, the probe 2 scans the surface S to be measured so that multiple measuring points are obtained (S2). The multiple measuring points are obtained as point sequence data in the scanning direction of the probe 2, for example.

Next, in the level-difference specifying step, a level-difference region in which a level difference exists in the surface S to be measured and a level-difference height are specified from the multiple measuring points obtained in the measuring step (S3). When the level-difference region and the level-difference height are specified, the point sequence is moved by the level-difference height in the target-data generating step. In other words, a pair of no-level-difference regions existing on both sides of the level-difference region is considered. The point sequence of one no-level-difference region out of the point sequences of the pair of no-level-difference regions is moved by the level-difference height. Then, a height of the point sequence of the one no-level-difference region is made coincident with a height of the point sequence of the other no-level-difference region (S4). In other words, a process of eliminating the level difference is performed. Such movement of the one no-level-difference region is performed for all level-difference portions (S5), so as to obtain fitting target data without a level difference.

On the other hand, in the reference-shape obtaining step, a reference shape without multiple design-level differences is obtained from the design shape. In this embodiment, the movement by the level-difference height is performed also for the design shape serving as a base of the object W to be measured. In other words, one of a pair of design no-level-difference shapes existing on both sides of the design-level difference of the design shape is moved by the design-level-difference height. Then, the height of the one design no-level-difference shape is made coincident with the height of the other design no-level-difference shape (S6). In other words, a process of eliminating the design-level difference is performed. The movement of the one design no-level-difference shape as described above is performed for every design-level-difference portion so that the design shape is converted into the reference shape without the design-level difference (S7). In the fitting step, a fitting process is performed between the fitting target data obtained in the above-mentioned steps S4 and S5 and the reference shape obtained by conversion in the above-mentioned steps S6 and S7 by the least square method, for example (S9). Then, a setting error is eliminated, and a residual is determined between the fitting target data and the reference shape after the fitting. Then, the shape of the surface S to be measured is measured, and the process is finished (S9). Hereinafter, each step is described in detail.

[Measuring Step]

Figure 4A:
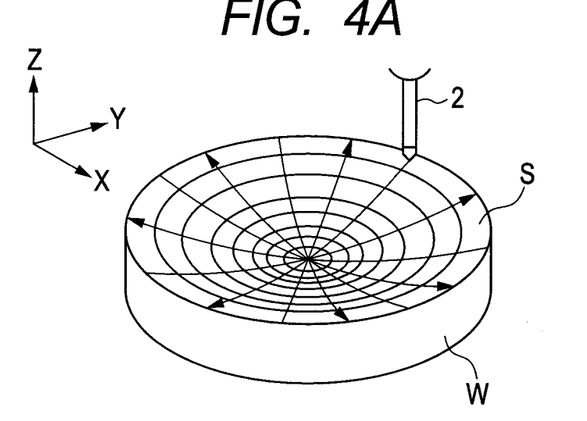
FIG. 4A is a perspective view illustrating scanning of a surface to be measured by the probe.
Figure 4B:
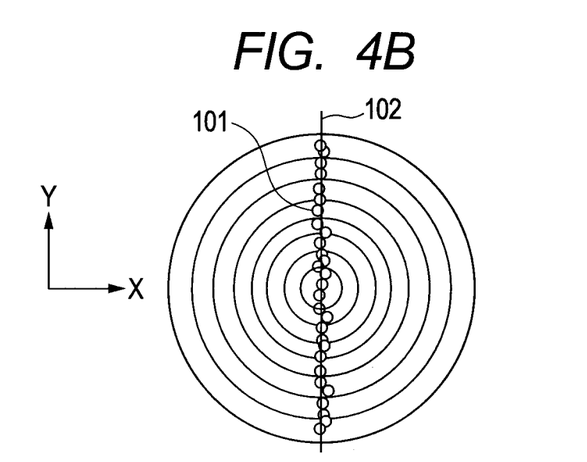
FIG. 4B is a plan view schematically illustrating a measured point sequence obtained by the scanning.
Figure 4C:
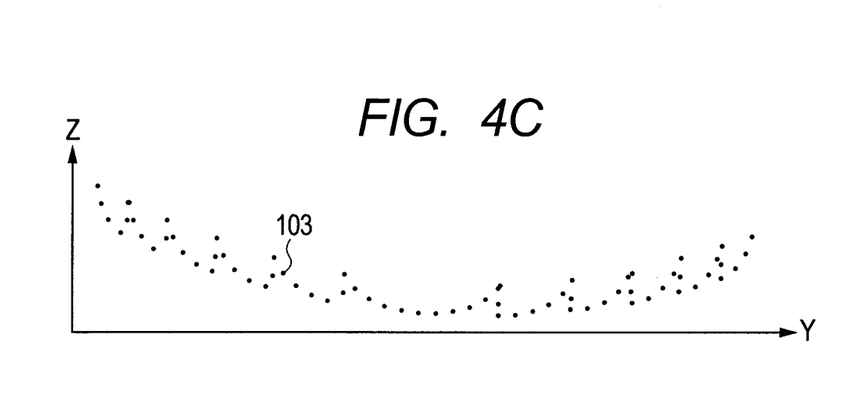
FIG. 4C is a graph illustrating the measured point sequence on an YZ plane.

In the measuring step, the probe 2 is moved to scan the surface S to be measured as illustrated in FIG. 4A. In other words, the probe 2 is moved to scan the surface S to be measured according to periodicity of the level differences formed on the surface S to be measured. For instance, it is supposed that the surface S to be measured has a circular shape, and multiple level differences are formed in a concentric manner with the center of the surface S to be measured. In this case, the probe 2 is moved in a diameter direction of the surface S to be measured so as to pass through the center of the surface S to be measured. Then, one line of point sequence data 101 constituted of multiple measuring points is obtained as illustrated in FIG. 4B. As to the point sequence data 101, it is inevitable that the measuring points are shifted slightly in the direction perpendicular to the scanning direction of the probe 2. For instance, even if the probe 2 is moved to scan linearly in the Y axis direction, the point sequence data 101 illustrated in FIG. 4B has an error in the X axis direction. Therefore, in the case of this embodiment, the point sequence data 101 is projected to a plane 102 parallel to the optical axis (Z axis) direction (YZ plane if the scanning direction is the Y axis direction), so as to generate two-dimensional data represented by projected point sequence data 103 illustrated in FIG. 4C.

The scanning of the surface S to be measured is performed at multiple positions in the circumferential direction of the surface S to be measured, and the projected point sequence data 103 is obtained also for each obtained point sequence data 101 and is then used for data processing described later. Note that, the two-dimensional data of the point sequence data 101 is generated in the above description, but each point sequence data may be handled as three-dimensional data.

[Level-Difference Specifying Step]

Figure 5A:
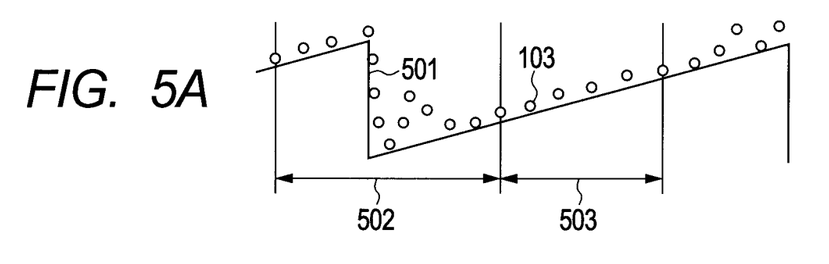
FIGS. 5A, 5B, 5C, 5D, and 5E are schematic diagrams for illustrating fitting target data, illustrating a sequence of steps for moving multiple measuring points by a level-difference height.

In the level-difference specifying step, multiple level-difference regions in which multiple level differences exist respectively on the surface S to be measured and heights of the multiple level differences are specified from the projected point sequence data 103 obtained as described above. First, how to specify the level-difference regions is described. FIG. 5A illustrates a predetermined level-difference region 502 in which a level difference 501 exists on the surface S to be measured and a predetermined no-level-difference region 503 outside the level-difference region 502. The surface S to be measured is formed based on the design shape having multiple periodical design-level differences as described above. Therefore, multiple level differences are formed periodically on the surface S to be measured. Therefore, this feature of the periodical level differences is utilized for specifying the level-difference region 502.

For instance, the Fourier transform of the projected point sequence data 103 is derived, and a point sequence region including a frequency within a predetermined threshold value is specified as the level-difference region. In other words, because a region with a level difference and a region without a level difference have different frequency characteristics, a predetermined threshold value is set based on an experiment or an empirical rule, and the region including the frequency within the threshold value is specified as the level-difference region in which a level difference exists.

Alternatively, an autocorrelation process is performed so as to determine the presence or absence of periodical level differences. Then, a predetermined region in which the determined level difference is positioned, namely, a point sequence within a predetermined range of a lateral coordinate (coordinate in the scanning direction) from the level-difference position is specified as the level-difference region. In particular, if a level-difference pitch based on the determined level-difference position (lateral coordinate distance between neighboring level differences) is not uniform over the entire surface S to be measured, the sections are split according to a width of the level-difference pitch, and a predetermined range of the lateral coordinate is defined in each section so that the level-difference region is specified. For instance, the predetermined range is set to be small in a section with a short level-difference pitch, while the predetermined range is set to be large in a section with a long level-difference pitch.

Alternatively, multiple measuring points measured in the measuring step are compared with the design shape so as to specify a predetermined region in which a design-level difference is positioned as the level-difference region. Specifically, the design shape is fit to all the measured point sequence data, namely, measured data of the entire surface S to be measured so as to specify the level-difference position. Then, a point sequence within a predetermined range of the lateral coordinate from the level-difference position is specified as the level-difference region.

Note that, if the multiple level-difference regions can be specified as described above, multiple no-level-difference regions outside the multiple level-difference regions can also be specified. In this embodiment, the multiple no-level-difference regions are assigned with numbers to be specified. For instance, if the surface S to be measured has a circular shape, and multiple level differences are formed in a concentric manner with the center of the surface S to be measured, the multiple level differences are numbered in order from the center so that the order of the no-level-difference region counted from the center can be specified.

Next, how to specify the level-difference height is described. As one method of specifying the level-difference height, there is a method of using the design shape. In other words, a level-difference height existing in each of the multiple level-difference regions specified as described above is regarded as the corresponding design-level-difference height among the multiple design-level differences of the design shape.

Alternatively, the level-difference height may be specified as follows. Specifically, among the multiple no-level-difference regions, a pair of no-level-difference regions adjacent to each other on both sides of each level-difference region is considered. In this case, the level-difference height existing in each of the multiple level-difference regions specified as described above is an interval between an approximate line that can be derived from multiple measuring points of one of the pair of no-level-difference regions and an approximate line that can be derived from multiple measuring points of the other no-level-difference region.

Figure 5B:
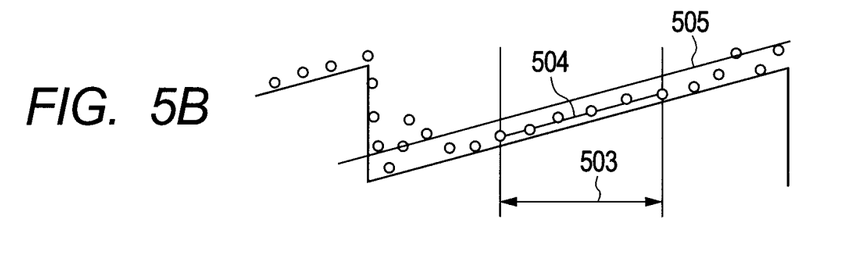

A more specific description is as follows. As illustrated in FIG. 5A, the level-difference region 502 includes a point sequence having low reliability as measured data due to the influence of bounding or the like of the probe when the probe passes through the level difference. On the other hand, the no-level-difference region 503 away from the level difference 501 is hardly affected by the bounding or the like of the probe and therefore includes a point sequence having high reliability as measured data. Therefore, as illustrated in FIG. 5B, an approximate line 504 is derived from multiple measuring points in the no-level-difference region 503 by the least square method, for example.

Here, the approximate line 504 may be used as an approximate line for determining the level-difference height, but the level-difference region 502 may also include a point sequence having high reliability as measured data. Therefore, in this embodiment, the region for deriving the approximate line for determining the level-difference height is expanded as follows. Specifically, a line 505 is derived, which is parallel to the approximate line 504 and is a predetermined threshold value in a level-difference-height direction from the approximate line 504. This predetermined threshold value is set based on an experiment or an empirical rule.

Figure 5C:
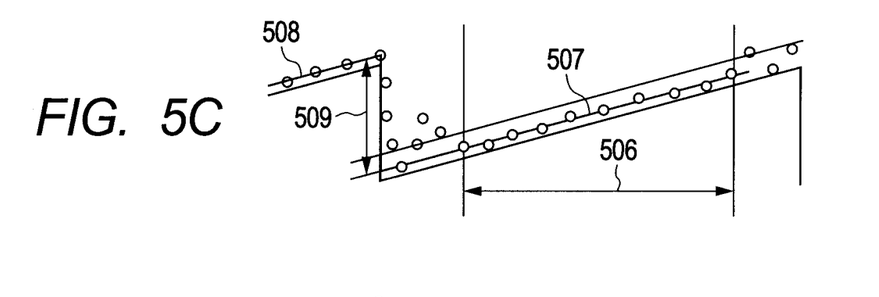

Next, as illustrated in FIG. 5C, the region for determining the approximate line is expanded to a region in which a measuring point exists that is below the line 505, namely within a predetermined threshold value. In other words, in the range of the threshold value defined by the line 505, the region for determining the approximate line is expanded also toward the level-difference region 502. When a point sequence outside the threshold value is found, the expansion of the region is stopped, and the range of the measuring point before the stop is specified as a new region 506 for determining the approximate line. Then, a second approximate line 507 is derived from the multiple measuring points in this region 506 by the least square method or the like. Because this second approximate line 507 is derived from measured data in a wider range than the above-mentioned approximate line 504, the second approximate line 507 can be said to be an approximate line more appropriate to the measured data.

In the same manner, a second approximate line 508 is also derived for the no-level-difference region (the other no-level-difference region) adjacent to the above-mentioned no-level-difference region (for example, one no-level-difference region) 503 via the level-difference region 502. Then, both the second approximate lines 507 and 508 are individually extended to the level difference 501, and an interval 509 between the second approximate lines 507 and 508 is specified as the level-difference height to be determined.

[Target-Data Generating Step]

In the target-data generating step, a level-difference-shape component of the measured data is removed from the level-difference region and the level-difference height specified as described above so that fitting target data is obtained. In other words, multiple measuring points of one of neighboring no-level-difference regions on both sides of the level-difference region are moved by the level-difference height, to thereby adjust the height of the multiple measuring points in one of the no-level-difference regions to the height of the multiple measuring points in the other no-level-difference region neighboring via the level-difference region. Then, a level-difference-shape component is removed from the measured data so that the fitting target data is obtained. Here, the above-mentioned movement of the multiple measuring points in the no level-difference region by the level-difference height is referred to as level-difference uplift, which is described below in detail.

Figure 5D:
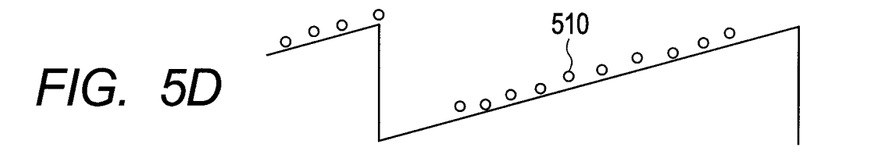

First, as described above, the multiple measuring points in the region 506 for determining the second approximate lines 507 and 508 have high reliability as measured data. Therefore, as illustrated in FIG. 5D, a measured point sequence 510 having high reliability constituted of the multiple measuring points in the region 506 is obtained.

Figure 5E:
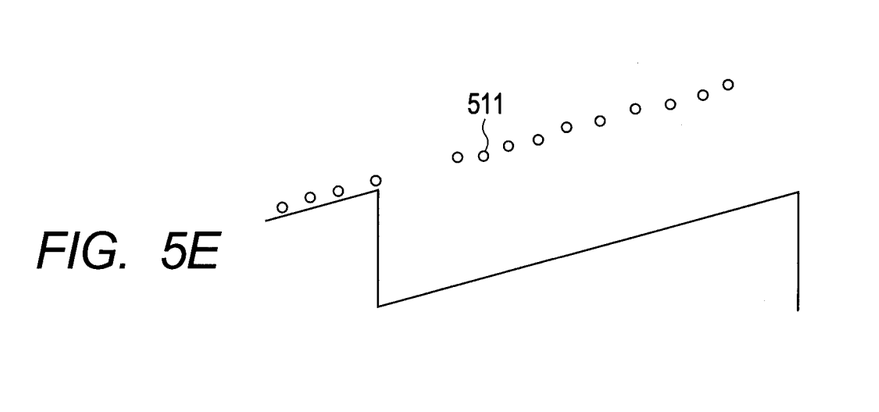

Next, as described above, the level-difference uplift is performed using the number obtained corresponding to the no-level-difference region and the level difference height at the number. In other words, the measured point sequence 510 illustrated in FIG. 5D is uplifted by the level-difference height (interval 509) determined as illustrated in FIG. 5C to the upper side in the diagram so that a point sequence 511 as illustrated in FIG. 5E is obtained. This level-difference-uplift process is performed sequentially from a center level difference existing at the center of a circular surface S to be measured, and the next outer level difference is uplifted in the height direction by an inner accumulated level-difference height.

Figure 6:
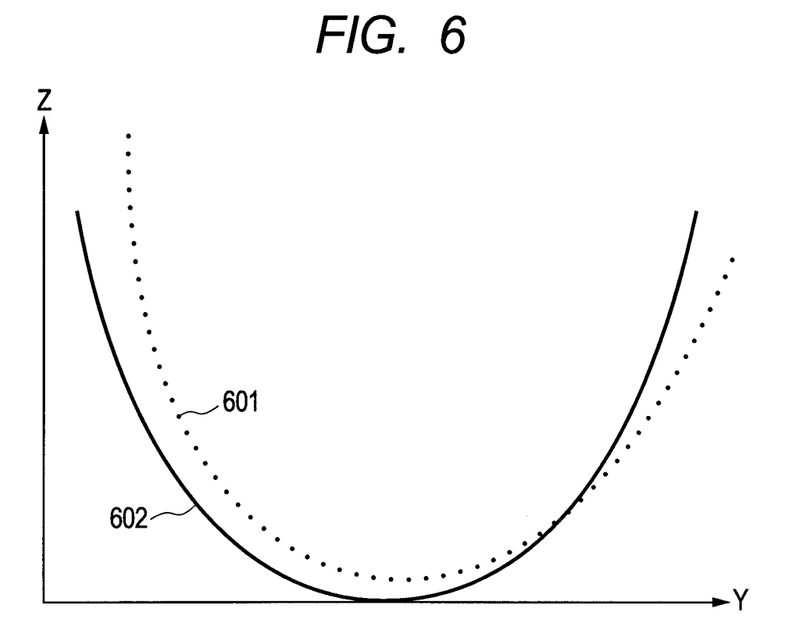
FIG. 6 is a graph illustrating fitting between the fitting target data and a reference shape.

Note that, this level-difference-uplift process may be performed from a periphery of the circular surface S to be measured. In addition, the movement of the multiple measuring points in the no-level-difference region may be performed in a push down direction, rather than in the above-mentioned uplift direction. In either case, the level-difference-uplift process or a level-difference-push-down process is performed for every level difference and every line on the surface S to be measured so as to obtain a measured point sequence (fitting target data) 601 from which the level-difference-shape components are removed as illustrated in FIG. 6.

Note that, the multiple measuring points in the region 506 for obtaining the second approximate lines 507 and 508 are moved for obtaining the fitting target data in the above description, but it is possible to move only the multiple measuring points in the no-level-difference region 503. In other words, it is possible to eliminate the steps of FIGS. 5B to 5D and to uplift the multiple measuring points in the no-level-difference region 503 instead of the measured point sequence 511 in the step of FIG. 5E. In short, it is sufficient if the level-difference-shape component can be removed by using the measured data of the no-level-difference region 503, and the region of data to be used can be arbitrarily set. However, because the region 506 has a wider range than the no-level-difference region 503, the fitting target data can be obtained more accurately.

[Reference-Shape Obtaining Step]

In the reference-shape obtaining step, the level-difference-shape component is removed from the design shape so that the reference shape is obtained. In other words, as to the design shape, one of the pair of design no-level-difference shapes neighboring to each other on both sides of the design-level difference is moved by the design-level-difference height so that the height of one of the design no-level-difference shape is adjusted to the height of the other of the pair of design no-level-difference shapes. Then, the design shape is converted into the reference shape without a design-level difference, which is described specifically as follows.

In other words, concerning the design shape too, similarly to the above-mentioned measured data, the design-level-difference uplift or push down is performed. Here, the design shape is formed of the design-level difference and the design no-level-difference shapes. The design no-level-difference shape is a shape between neighboring level differences of the design shape. In addition, in this specification and claims, the level difference and the no-level-difference shapes concerning the design shape are referred to as the design-level difference and the design no-level-difference shapes for convenience sake in order to distinguish from the above-mentioned measured data.

Concerning this design shape too, the design no-level-difference shapes are assigned with numbers from the center. Then, the level-difference uplift (or the push down, the same is true in the following) is performed using the design-level-difference height at the number. This level-difference-uplift process is performed sequentially from the center level difference existing at the center of the circular design shape, and the next outer level difference is uplifted in the height direction by an inner accumulated level-difference height. Then, the level-difference-uplift process is performed for every design-level difference and every line of the design shape so as to obtain a reference shape 602 from which the level-difference-shape components are removed as illustrated in FIG. 6. Note that, a level-difference height obtained from the measured data may be used as the level-difference height. In addition, the design shape means a design shape itself or a shape obtained by changing a shape parameter of the design shape.

[Fitting Step]

In the fitting step, the fitting is performed between the measured point sequence (fitting target data) 601 and the reference shape 602 determined as described above. In other words, the fitting is performed between the measured point sequence 601 and the reference shape 602 using the least square method or the like.

Thus, a setting error of the object W to be measured, namely, a setting error to the shape-measuring apparatus 1 is removed. Then, a residual is determined between the measured point sequence 601 and the reference shape 602 after the fitting, so as to measure a shape of the surface S to be measured.

In the case of this embodiment, the fitting is performed between the measured point sequence 601 obtained by removing the level-difference-shape components from the measured data and the reference shape 602 without a level-difference-shape component obtained from the design shape. Therefore, the fitting can be performed accurately between the measured data of the surface S to be measured, which is formed based on the design shape having multiple periodical design-level differences, and the design shape. Because the fitting can be performed accurately, a setting error can also be removed accurately, and hence a shape of the surface S to be measured can also be measured accurately.

Note that, the fitting is performed between lines in the above description, but the fitting may be performed between surface shapes.

In addition, using information of the level-difference region and the level-difference height specified in the level-difference specifying step, the level-difference-height-uplift process illustrated in FIG. 5E may be performed on the entire surface shape, rather than on a line basis. In this case, all lines can be processed as a batch so that calculation speed is improved. In addition, an error is added to the point sequence as the two-dimensional data due to an influence of projection. Therefore, if the uplift process is performed in the state of the three-dimensional point sequence, calculation accuracy is also improved.

In addition, the uplift process of the design shape may be replaced with preparation of a smooth reference shape without a level difference obtained by adding a shape component from which the level differences are removed in advance and a curved surface-shape component. Thus, the level-difference-uplift process of the design shape becomes unnecessary, and calculation speed is improved.

Further, setting-error correction is performed in S8 of FIG. 3 in the fitting, namely in the state where the level difference is uplifted, but it is also possible to use a setting-error amount obtained at this time, and to return to S3 of FIG. 3 again. Thus, the level-difference position can be specified in the state where a setting error amount is accurately grasped, and hence the accuracy is improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-284198, filed Dec. 21, 2010, which is hereby incorporated by reference herein in its entirety.

REFERENCE SIGNS LIST

1: shape-measuring apparatus
2: probe
3: surface plate
4: moving unit
5: displacement measuring unit
6: control portion
103: projected point sequence data (plural measuring points)
502: level-difference region
503: no-level-difference region
504: approximate line
507, 508: second approximate line
510: measured point sequence (plural measuring points)
601: measured point sequence (fitting target data)
602: reference shape
W: object to be measured
S: surface to be measured

What is claimed is:

1. A shape measuring method for measuring a shape of a surface to be measured which is formed based on a design shape having multiple periodical design level differences, by using a probe to scan, the shape measuring method comprising:
    a measuring step of scanning the surface to be measured with the probe to obtain multiple measuring points;
    a level difference specifying step of specifying multiple level-difference regions having multiple level differences formed on the surface to be measured and a height of each of the multiple level differences from the multiple measuring points, wherein the surface to be measured includes no-level-difference regions on both sides of at least one level-difference region, forming a pair of no-level-difference regions associated with the level-difference region, each member of the pair being located on a different side of the interposed level-difference region interposed between the two members of the associated pair;
    a target data generating step of moving multiple measuring points measuring a first member of the pair by the height of the level difference of the associated interposed level-difference region to adjust the heights of the multiple measuring points of the first member of the pair to the heights of the multiple measuring points measuring a second member of the pair, to thereby obtain fitting target data including multiple measuring points corresponding to the no-level difference regions after the movement of the multiple measuring points;
    a reference shape obtaining step of obtaining a reference shape without the multiple design level differences from the design shape; and
    a fitting step of performing fitting between the fitting target data and the reference shape,
    wherein the shape of the surface to be measured is measured by determining a residual between the fitting target data and the reference shape after the fitting.

2. The shape measuring method according to claim 1, wherein the reference shape obtaining step includes converting the design shape by moving one of a pair of design no level difference shapes neighboring to each other on both sides of the design level difference by a height of the design level difference so that a height of the one of the pair of design no level difference shapes is adjusted to a height of another one of the pair of design no level difference shapes, to thereby obtain the reference shape.

3. The shape measuring method according to claim 1, wherein the level difference specifying step includes deriving Fourier transform of the multiple measuring points, and specifying a region including a frequency within a predetermined threshold value as the level difference region.

4. The shape measuring method according to claim 1, wherein the level difference specifying step includes performing an autocorrelation process of the multiple measuring points so as to determine the presence or absence of periodical level differences, and specifying a predetermined region in which the determined periodical level differences are positioned as the level difference region.

5. The shape measuring method according to claim 1, wherein the level difference specifying step includes comparing the multiple measuring points with the design shape, and specifying a predetermined region in which the design level difference is positioned as the level difference region.

6. The shape measuring method according to claim 1, wherein the height of the each of the multiple level differences specified in the level difference specifying step comprises a height of a corresponding design level difference among the multiple design level differences of the design shape.

7. The shape measuring method according to claim 1, wherein the height of the each of the multiple level differences specified in the level difference specifying step comprises an interval between an approximate line that is derived from the multiple measuring points in the one no level difference region and an approximate line that is derived from the multiple measuring points in the another no level difference region.

* * * * *